United States Patent Office 3,518,282
Patented June 30, 1970

3,518,282
METHOD FOR PREPARING LEVOPIMARIC ACID DIOXIDE FROM PEROXIDE USING FERROUS SULFATE
Walter H. Schuller, Jacob C. Minor, and Ray V. Lawrence, Lake City, Fla., and Hideo Kanno, Tokyo, Japan, assignors to the United States of America as represented by the Secretary of Agriculture
No Drawing. Filed June 7, 1967, Ser. No. 644,087
Int. Cl. C07d 5/32
U.S. Cl. 260—346.2                4 Claims

ABSTRACT OF THE DISCLOSURE

Levopimaric acid dioxide can be prepared from levopimaric acid transannular peroxide using aqueous solutions of ferrous sulfate at ambient temperatures. A dioxide having excellent purity is obtained. The barium/cadmium salts of levopimaric acid dioxide are excellent heat stabilizers for poly-(vinyl chloride)-poly-(vinyl acetate) resins.

A non-exclusive, irrevocable, royalty-free license in the invention herein described throughout the world for all purposes of the United States Government, with the power to grant sublicenses for such purposes, is hereby granted to the Government of the United States of America.

FIELD OF THE INVENTION

This invention relates to a method for the preparation of levopimaric acid dioxide (II) and to its barium/cadmium salts. More specifically, it relates to a method for preparing (II) from 8,12-peroxy-Δ13(14)-dihydroabietenoic acid (I) by treating (I) with an aqueous solution of ferrous sulfate at ambient temperature. Still more specifically, it relates to the barium/cadmium salts of (II) as heat stabilizers for poly-(vinyl chloride)-poly-(vinyl acetate) resins.

The structure of the dioxide, sometimes referred to below as the free acid, is (II).

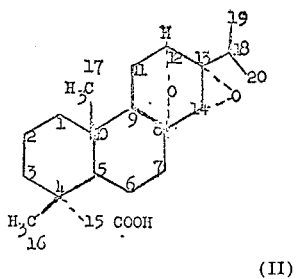

(II)

It exhibits $[\alpha]_D^{25}$ —70.3° (c. 0.80 in 95% ethanol), has a melting point (M.P.) of 172–174° C., and is 8,12-epoxy-13(14)-epoxyabietanoic acid.

The structure of 8,12-peroxy-Δ13(14)-dihydroabietenoic acid, frequently referred to below as levopimaric acid transannular peroxide, is (I):

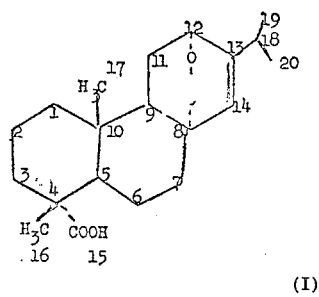

(I)

It exhibits $[\alpha]_D^{25}$+101° (0.1% in 95% ethanol), $M_D$+305. The ring numbering system is according to Chemical Abstracts Method which is the same as I.U.P.A.C. Rule S–1. (International Union of Pure and Applied Chemistry, Rule S–1)—Chemical Abstracts, 56 Introduction to Subject Index, page 64 N, Item 431—Footnote. The footnote (Reference 37) refers to J. Am. Chem. Soc. 82, 5577 (Rule S–1) (1960). See also "Some Reactions of Levopimaric Acid Dioxide" by Kanno, Hideo; Schuller, Walter H., and Lawrence, Ray V., J. Org. Chem. 31, 4138 (1966).

DEFINITION OF TERMS

As used herein, the term levopimaric acid transannular peroxide (I) is meant to include not only the transannular peroxide of levopimaric acid, but the transannular peroxides derived from the photosensitized oxidation of pine gum. The three important transannular peroxides so derived are the transannular peroxides of levopimaric, palustric and neoabietic acids. These three resin acids comprise a major portion of the resin acids in pine gum, and levopimaric acid is the major acid present. Consequently, the term "levopimaric acid transannular peroxide" (I) and "levopimaric acid dioxide" (II), will be used to represent the "peroxides" and "dioxides," respectively, in the instant specification and the claims below, but the invention is not restricted to (I) and (II).

DESCRIPTION OF THE PRIOR ART

The methods for preparing levopimaric acid transannular peroxide (I), and the transannular peroxides of photosensitized oxidized pine gum are described in U.S. Pats. 2,899,463 (1959), 2,996,515 (1961), 3,230,235 (1966), 3,268,621 (1966), and by W. H. Schuller, J. C. Minor, and R. V. Lawrence in an article in Ind. & Eng. Chem., Prod. Res. and Development, 3, No. 2, pp 97–100 (1964). Structurally, the procedure follows:

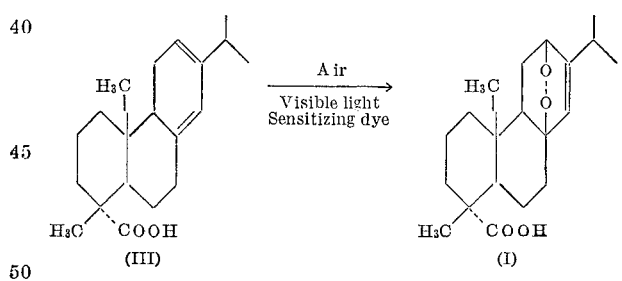

A novel method for the *thermal* rearrangement of levopimaric acid transannular peroxide (I) and other pine gum peroxides frequently referred to as peroxides to form a dioxide (II) is described in the copending application of W. H. Schuller and R. V. Lawrence which was filed Apr. 2, 1964, with Ser. No. 356,987, now U.S. Pat. No. 3,463,769. As noted therein these dioxides (formerly named diepoxides) provide excellent low-cost raw materials in the field of epoxy resins, adhesives, and plastics.

HOW PRIOR ART FAILED

The dioxides formed by the *thermal* rearrangement of the peroxides result in some undesirable side reactions. This necessitates a considerable amount of purification with a consequent decrease in yield of the product dioxide, thereby increasing the cost of the product dioxide.

SUMMARY OF THE INVENTION

We have now discovered that rearrangement of the transannular peroxides to dioxides by the use of aqueous solutions of ferrous sulfate overcomes these problems. The use of ferrous sulfate produces a much cleaner reaction with high, almost quantitative yields of the dioxides. Most important, the resulting product has excellent purity without further treatment.

When these dioxides are converted to their barium/cadmium mixed salts, they become useful heat stabilizers for certain hydrophobic resins such as poly-(vinyl chloride) resins which comprise about 95% poly-(vinyl chloride) and 5% poly-(vinyl acetate).

The barium/cadmium mixed salts of these dioxides and their use as heat stabilizers for poly-(vinyl chloride) resins are embodiments of the instant invention and are claimed herein.

The conversion of levopimaric transannular peroxide to the dioxde using ferrous sulfate solutions can be carried out at ambient temperatures ranging about from 10° C. to 40° C. The preferred temperature ranges about from 25° to 35° C., or room temperature. The amount of ferrous sulfate required can be varied about from 0.1 to 1.0 gram atom of ferrous sulfate based on the molar weight of the peroxide. We prefer a mole ratio in the range about from 0.3 to 0.4 gram atom of ferrous sulfate for 1 mole of the peroxide.

The solvent for the ferrous sulfate should be an aqueous solvent. Because of its simplicity and general availability, water is the solvent of choice for the ferrous sulfate.

The solvent for the transannular peroxide also should be an aqueous solvent and must be miscible with water. The preferred solvent pair for the peroxide and ferrous sulfate is dioxane-water.

As will be noted in the examples below, the water solution of ferrous sulfate and the water-miscible solution of the transannular peroxide are prepared separately. The ferrous sulfate solution is then added slowly to the stirred solution of the transannular peroxide. During the addition an exothermic reaction (exotherm) occurs. A white solid is precipitated and the solution becomes slightly acid (pH 4.0–4.5). Stirring is continued until the exothermic reaction ceases and the reaction medium has cooled to room temperature after which a small quantity of water is added dropwise (see Example 1). The dropwise addition of water is continued until the white precipitate of dioxide is converted to a syrup. The syrup is then isolated by physical means, and such as decantation, and the product dioxide recovered as a dry friable powder by drying in the presence of a suitable absorbent for the aqueous medium, such as Drierite (a specially prepared anhydrous calcium sulfate which is commercially available). An aqueous solution (preferably a dioxane solution) of the dioxides of levopimaric acid (or of the acids derived from photosensitized, oxidized pine gum) can then be reacted with an aqueous solution (preferably water) of barium acetate monohydrate and cadmium acetate dihydrate (see Example 7) to form the mixed barium/cadmium salts of these dioxides. The peroxide is first dispersed in water after which a dilute solution of $NH_4OH$ is added to give a pH of about 7.0–7.5, whereupon the dioxide dissolves. Upon addition of the barium/cadmium acetates, a precipitated mixed salt is formed, collected (preferably by filtration), washed with water, and dried under vacuum.

Various ratios of the barium/cadmium salts can be used, ranging about from equal molar parts to about 2 molar parts cadmium acetate dihydrate to 1 molar part barium acetate monohydate to about 2 molar parts barium acetate monohydrate to about 1 molar part of cadmium acetate dihydrate. We prefer about 1 molar cadmium acetate dihydrate to 1 molar part barium acetate monohydrate.

The dried barium/cadmium 1:1 mixed salt of the resin acid dioxide(s) is then mixed (about 3 weight percent salt) with about 95 weight percent of a commercially available 95% poly-(vinyl cholride)-5% poly-(vinyl acetate) resin, after which the mixture is stirred into an equal weight of dioctyl phthalate, and heated to about 180° C. for about 30 minutes (see Examples 2 and 7 below). Only a pale yellowish color developed. This was about equivalent to a WW color graded rosin.

In the absence of the mixed salt of resin acid dioxides, the above poly-(vinyl chloride)-poly-(vinyl acetate) copolymer, under similar heating conditions, became dark brown, almost black.

For some reason, presently unknown, aqeuous solutions ferrous sulfate cause the rearrangement of the levopimaric acid transannular peroxide (I) to the dioxide (II). Salts such as nickelous acetate, cuprous chloride, sodium bisulfite, potassium dihydrogen phosphate, ferric sulfate, or sodium bisulfate do not cause this rearrangement.

When pine-gum resin acids which had not been converted to the dioxides were converted to their barium/cadmium salts and were used as heat stabilizers at 180° C. for 30 minutes for the 95% poly-(vinylchloride)-5% poly-(vinyl acetate) resins, the resultant plastic disc had a tan or light brown color equal to grade H rosin. The commercial color grades of rosin range from $x$ (lightest) through WW (water white), WG (water glass), N, M, K, I, H, G, F, E, and D with increasing color. Grade D is practically black.

The invention will be more fully described in conjunction with the following examples which are intended as illustrative.

Unless otherwise stated, all parts and percentages are by weight; temperatures are indicated in degrees centigrade; melting points are determined by means of a Thomas Hoover Melting Point Apparatus; infrared $\lambda_{max}$ (Nujol mull) is determined by means of a Parkin-Elmer Model 21 infrared spectrophotometer; N.M.R. is determined by means of a Varian A–60 spectrophotometer; $M_D$ is $(\alpha)_D^T \times M.W.$ (molecular weight) and $(\alpha)_D^T$ is determined on a Franz Schmidt and Haensch precision polarimeter and $(\alpha)_D^{25}$ is determined by standard equipment. The oxirane content of the dioxide in Example 6 is determined by dissolving the dioxide in a measured excess of a standard solution of dry hydrogen chloride in dry ether and after standing for 2 hours at room temperature it is back titrated with standard alkali using a pH meter. The 13,14-oxide group consumes one equivalent of hydrogen chloride under these conditions and the 8,12-oxide group is stable. The calculations are made accordingly.

In the following example purified levopimaric transannular peroxide (I) is treated with an aqueous solution of ferrous sulfate to form levopimaric acid dioxide.

EXAMPLE 1

A solution of 0.16 g. of ferrous sulfate heptahydrate (0.376 gram atom based on peroxide; 0.00056 mole) dissolved in 0.5 ml. of water was added dropwise to a solution of 0.50 g. (0.0015 mole) of purified levopimaric acid transannular peroxide in 4.0 ml. of peroxide free dioxane (solution exhibited pH 4.2). A white solid precipitated out and an exotherm (temperature rise) to 36° C. occurred. After one hour at room temperature, 7 ml. of water was added. The solid dissolved, a syrup came out of solution which crystallized on rubbing and cooling; yield 0.45 g. (90%); $[\alpha]_D^{25}$—79.0° (c.=1.27 in 95% ethanol), no change in rotation on recrystallization from methanol; infrared spectrum in Nujol mull and in chloroform solution essentially identical to the spectra of levopimaric acid dioxide prepared thermally (see Ind. & Eng. Chem., Prod. Res. & Dev., 3, No. 2, pp. 97–100 (1964)).

*Analysis.*—Calc'd for $C_{20}H_{30}O_4$ (percent): C, 71.8; H, 9.0; O, 19.1. Found (percent): C, 71.9; H, 9.2; O, 19.0.

EXAMPLE 2

A portion of the pure levopimaric acid dioxide prepared in Example 1 was used in the preparation of a 1:1 barium/cadmium mixed salt. The procedure follows: To 1.02 g. of the pure dioxide from photosensitized oxidized levopimaric acid dispersed in 50 ml. of water was added 4.5 ml. of 2% ammonium hydroxide. All solids dissolved and the solution exhibited pH 7.0–7.5. To this solution was added dropwise with stirring a solution of 0.2 g. of barium acetate monohydrate and 0.205 g. of cadmium acetate dihydrate in 10 ml. of water. A heavy white precipitate was formed. The 1:1 precipitated mixed salt was collected, washed with water and dried under vacuum.

An intimate mixture of 2.5 g. of 95% poly-(vinyl chloride)-5% poly-(vinyl acetate) copolymer and 0.075 g. (3%) of the barium/cadmium mixed salt of the pure dioxide of levopimaric acid was made and mixed thoroughly with 2.5 g. of dioctyl phthalate. The mixture was put in a Petri dish of 45 mm. in diameter and heated in a hot air oven at 180° for 30 minutes. A clear plastic disc was obtained which was pale yellow in color (paler in color than x grade rosin) showing the considerable extent to which the poly-(vinyl chloride) was stabilized by the added 1:1 barium/cadmium mixed salt of the levopimaric acid dioxide.

In the following example aqueous solutions of several salts were substituted for the solution of ferrous sulfate.

EXAMPLE 3

Example 1 was repeated using 0.00056 mole of each of the following salts in place of ferrous sulfate (the pH of the solution, where measured, is given in parentheses): Nickelous acetate, cuprous chloride, sodium bisulfite, sodium bisulfate (pH 2.2), potassium dihydrogen phosphate (pH 5.5) and ferric sulfate (pH 2.1). In all cases, the product was isolated and found to be essentially unreacted levopimaric transannular peroxide based on optical rotation and infrared spectrum.

EXAMPLE 4

Example 1 was repeated except that one gram atom of ferrous sulfate was used based on levoperoxide, i.e., 0.50 g. of levoperoxide in 4 ml. of peroxide-free dioxane was treated with 0.417 g. of ferrous sulfate heptahydrate in 1.0 ml. of water. A considerable quantity of white crystalline solid came down. An exotherm to 33° C. was noted. After one hour, 14 ml. of water was added. A brown oil came down, which did not crystallize. The syrup was dried to a friable powder, wt. 0.38 g. (75% yield); $[\alpha]_D^{25}$ −64.7° (c.=0.61 in 95% ethanol); infrared spectrum indicated major product present to be levopimaric acid dioxide.

EXAMPLE 5

A solution of 0.0417 g. of ferrous sulfate heptahydrate (0.1 gram atom of ferrous sulfate based on peroxide; 0.00015 mole) in 0.5 ml. of water was added to 0.50 g. (0.0015 mole) of levopimaric acid transannular peroxide in 4 ml. of peroxide-free dioxane. A slow exotherm which raised the temperature of the solution from 28° C. to 30° C. was observed. A small amount of white solid came down. After one hour at room temperature 7 ml. of water was added. The oil crystallized to give 0.37 g. (74%) of product; $[\alpha]_D^{25}$ −65.7° (c.=0.66 in 95% ethanol); infrared spectrum indicated major product present to be levopimaric acid dioxide.

In the following example, peroxides obtained from photosensitized-oxidized pine gum are treated with an aqueous ferrous sulfate solution at ambient temperature.

EXAMPLE 6

To a solution of 50 ml. of peroxide-free dioxane containing 10.5 g. of dry photosensitized-oxidized pine gum containing about 0.46 equivalent of peroxide per mole of resin acid present was slowly added a solution of 1.7 g. of ferrous sulfate heptahydrate in 7 ml. of water. An exotherm from 25.5° C. to 31° C. took place. After two hours at room temperature, 125 ml. of water was added. An oil came down and was dried to a friable powder in a vacuum desiccator over Drierite; yield 10.2 g. (97%). An analysis for oxirane content via the method of hydrogen chloride in dry ether indicates about 0.46 equiv. of dioxide present or about a quantitative conversion of peroxide to dioxide.

In the following example the dioxides from Example 6 were converted into mixed barium/cadmium salts and used as heat stabilizers with poly-(vinyl chloride) resins.

EXAMPLE 7

An intimate mixture of 2.5 g. of a 95% poly-(vinyl chloride)-5% poly-(vinyl acetate) copolymer resin and 2.5 g. of dioctyl phthalate was made and placed in a Petri dish 45 mm. in diameter and heated in a hot air oven at 180° C. for 30 minutes. Upon removal a clear piece of plastic, dark brown (almost black) in color, was obtained.

A sample of the 1:1 (molar ratio) barium/cadmium salt of the mixed dioxides of photosensitized-oxidized pine gum (as prepared in Example 6 above) is prepared as follows: To 1.02 g. of the mixed dioxides of photosensitized-oxidized pine gum dispersed in 50 ml. of water is added 4.0 ml. of 2% ammonium hydroxide. All solids dissolve and the solution exhibits pH 7.0–7.5. To this solution is added dropwise with stirring a solution of 0.2 g. of barium acetate monohydrate and 0.205 g. of cadmium acetate dihydrate in 10 ml. of water. A heavy white precipitate is formed. The precipitated mixed salt is collected, washed with water to remove unwanted impurities and dried under vacuum.

An intimate mixture of 2.5 g. of the copolymer stated above and 0.075 g. (3%) of the 1:1 barium/cadmium mixed salts of the mixed diepoxides of photosensitized-oxidized pine gum (as prepared above) is made and mixed thoroughly with 2.5 g. of dioctyl phthalate. The mixture is put in a Petri dish of 45 mm. in diameter and heated in a hot air oven at 180° for 30 minutes. A clear plastic disc is obtained which is pale yellow in color (about equal to a grade WW rosin) showing the considerable extent to which the copolymer was stabilized by the added 1:1 barium/cadmium mixed salts of the mixed dioxides of photosensitized-oxidized pine gum.

In the following example the mixed barium/cadmium salts of unoxidized pine gum resin acids were prepared and tested as heat stabilizers for the copolymers.

EXAMPLE 8

A sample of the mixed barium/cadmium mixed salts of the acids present in unoxidized pine gum was prepared as follows: To 0.99 g. of the mixture of resin acids from pine gum dispersed in 50 ml. of water is added 4.0 ml. of 2% ammonium hydroxide. All solids dissolved and the solution exhibited pH 7.0–7.5. To this solution was added dropwise with stirring a solution of 0.2 g. of barium acetate monohydrate and 0.205 g. of cadmium acetate dihydrate in 10 ml. of water. A heavy white precipitate was formed. The precipitated mixed salt was collected, washed with water and dried under vacuum.

An intimate mixture of 2.5 g. of the same copolymer used in the previous examples and 0.075 g. (3%) of the dry barium/cadmium mixed salts of the pine gum acids was made and mixed thoroughly with 2.5 g. of dioctyl phthalate. The mixture was put in a Petri dish of 45 mm. in diameter and heated in a hot air oven at 180° for 30 minutes. A clear plastic disc was obtained which was brown in color (about equal to grade D rosin). This shows that the 1:1 barium/cadmium salts of unoxidized pine gum resin acids would not be commercially acceptable as a stabilizer for commercial poly-(vinyl chloride) plastics.

We claim:
1. In the process of converting resin acid transannular peroxides derived from the photosensitized oxidation of pine gum to the corresponding dioxides, the improvement which comprises forming a reaction mixture by:
(a) slowly adding, at ambient temperature, an aqueous solution consisting of 0.3 to 0.4 gram atom ferrous sulfate heptahydrate to a solution in dioxane of about

1 gram mole peroxide to form the dioxide as a white precipitate in the reaction mixture, (b) slowly adding water to the reaction mixture whereby said white precipitate is converted to a syrup, (c) separating the syrup from the reaction mixture, and (d) drying the separated syrup in vacuo.

2. The process defined in claim 1 wherein the resin acid transannular peroxide is levopimaric acid transannular peroxide.

3. A process for the preparation of the mixed barium/cadmium salts of pine gum resin acid dioxides comprising the following steps:

(a) forming an aqueous solution comprising about 1 to 2 molar parts barium acetate monohydrate and 2 to 1 molar parts cadmium acetate dihydrate, (b) forming an aqueous dispersion of about 2 molar parts of the mixed resin dioxides, (c) adding dilute ammonium hydroxide to the aqueous dispersion of step (b) to give a pH about from 7.0 to 7.5 whereupon the dispersion of the dioxide is dissolved, (d) adding dropwise, with stirring, the solution of step (a) to the solution of step (c) to produce a heavy, white precipitate, (e) separating the precipitate of step (d), (f) washing the precipitate, and, thereafter, (g) drying the mixed barium/cadmium salts of the gum resin dioxides in vacuo.

4. The process defined in claim 3 wherein the pine gum resin dioxide is levopimaric acid dioxide.

References Cited

Kanno et al.: Journal of Organic Chem., vol. 31, p. 4138–42, December 1966.

ALEX MAZEL, Primary Examiner

B. I. DENTZ, Assistant Examiner

U.S. Cl. X.R.

260—45.8